(12) United States Patent
Scolamiero et al.

(10) Patent No.: US 8,012,392 B2
(45) Date of Patent: *Sep. 6, 2011

(54) METHOD FOR COOLING GOLF BALL CORES

(75) Inventors: Stephen K. Scolamiero, Bristol, RI (US); LeRoy H. Seymour, Acushnet, MA (US); Michael F. Vieira, Acushnet, MA (US)

(73) Assignee: Acushnet Company, Fairhaven, MA (US)

(*) Notice: Subject to any disclaimer, the term of this patent is extended or adjusted under 35 U.S.C. 154(b) by 2 days.

This patent is subject to a terminal disclaimer.

(21) Appl. No.: 12/725,516

(22) Filed: Mar. 17, 2010

(65) Prior Publication Data

US 2010/0225022 A1    Sep. 9, 2010

Related U.S. Application Data

(62) Division of application No. 11/609,433, filed on Dec. 12, 2006, now Pat. No. 7,708,545.

(51) Int. Cl.
*B29C 71/00* (2006.01)

(52) U.S. Cl. ......... 264/236; 264/237; 264/347; 264/348

(58) Field of Classification Search .................. 264/236, 264/237, 347, 348
See application file for complete search history.

(56) References Cited

U.S. PATENT DOCUMENTS

| | | | |
|---|---|---|---|
| 1,969,104 A | 8/1934 | Sibley et al. | |
| 3,072,968 A | 1/1963 | Watson et al. | |
| 3,733,849 A | 5/1973 | Cantagallo et al. | |
| 3,965,055 A | 6/1976 | Shichman et al. | |
| 4,899,869 A | 2/1990 | Johnson | |
| 2003/0052438 A1* | 3/2003 | Brum et al. | 264/236 |
| 2006/0022364 A1 | 2/2006 | Scolamiero et al. | |
| 2006/0032078 A1* | 2/2006 | Charleston et al. | 34/201 |

* cited by examiner

*Primary Examiner* — Joseph S Del Sole
*Assistant Examiner* — James Sanders
(74) *Attorney, Agent, or Firm* — Daniel W. Sullivan

(57) ABSTRACT

Methods for cooling golf ball cores are provided. The methods involve passing a matrix of hot golf ball cores through a die plate to separate individual golf ball cores from the matrix. The die plate has a plurality of holes and each hole is sized to allow a single golf ball core to pass there through. A post-cure unit is arranged to receive the hot cores for additional curing and cross-linking. The hot, cured golf ball cores are then passed through a cooling section where high velocity air is passed over the golf ball cores to achieve the desired level of cooling. The cooling section may contain a fan assembly including an air diffuser to provide sufficient air flow coverage. The cooled golf ball cores may be delivered to a pneumatic delivery system for additional processing.

9 Claims, 3 Drawing Sheets

US 8,012,392 B2

METHOD FOR COOLING GOLF BALL CORES

CROSS-REFERENCE TO RELATED APPLICATIONS

The present application is a divisional of U.S. patent application Ser. No. 11/609,433 having a filing date of Dec. 12, 2006, now U.S. Pat. No. 7,708,545 now allowed, the entire disclosure of which is hereby incorporated by reference.

FIELD OF THE INVENTION

The present invention relates to a method for cooling golf ball cores and apparatus for use therein. More preferably, the present invention relates to a method and apparatus for cooling golf ball cores integrated into the part die-out station at the press.

BACKGROUND OF THE INVENTION

Core compositions for solid golf balls primarily contain cross-linked polybutadiene. The polybutadiene is typically mixed with other materials to obtain a uniform composition. This composition is formed into the spherical cores of the golf balls using either an injection mold or a compression mold.

In the case of compression molding, the uniform composition is fed into a screw-type extruder that forces the composition through a die. The composition exits the die as a continuous length or extrudate at a predetermined discharge rate. The extrudate is guided past a cutting device, for example a rotating knife having a substantially constant cutting rate, and is cut into discrete pieces called preforms. Each preform is advanced to a spherical cavity defined by a pair of half-molds within the compression mold. The compression mold subjects the preform to heat and pressure, which causes the preform to expand and fill the spherical cavity. The preform is cured by heat in the mold to form a golf ball core. For injection molding, the core composition is injected directly into the spherical cavities of the mold.

A typical mold does not contain a single spherical cavity but a plurality of cavities arranged in columns and rows, i.e., a matrix. In order to maintain the matrix in continuous sheet form, cavities are filled with an excess of rubber stock required to completely fill the cavities and the excess rubber spills out of the cavity as "overflow." The overflow from individual cavities knits together with overflows from adjacent cavities to form the matrix sheet with molded parts fixed within the sheet. After all of the cavities within the mold are filled with rubber stock and the formed spherical cores are connected to the sheet in a suspended manner through webs or runners. Individual cores are separated from the matrix. Portions of the overflow remain attached to the separated cores and can cause equipment malfunction in subsequent manufacturing processes.

Current rubber molding technology includes items such as parts die-out devices at the molding press to separate individual cores from the matrix. Subsequent processing of the cores into finished golf balls requires cooling of the cores and manual handling. However, cooling adds significant time to the process and manual handling also adds time and associated costs. Attempts at decreasing the cooling time by immediately quenching the cores can reduce the desirable cross-linking in the core that can adversely affect the physical properties of the core.

Therefore, there remains a need for a system for molding golf ball cores that reduces the cooling time of the cores after molding but does not adversely affect the physical properties of the core. In addition, the system should be sufficiently automated optionally with a device to sort out cores with molding flash attached so as to minimize the need for significant manual handling of the golf ball cores.

SUMMARY OF THE INVENTION

The present invention is directed to a cooling system for golf ball cores that is integrated to the part die-out station at the press. The cooling system includes both an integrated part post-cure system and an internal cueing hopper for product changeover. Automated forced air convection parts cooling equipment is incorporated into the part die-out station at the press. The integrated post-cure system is positioned before the cooling equipment to improve curing and cross-linking in the cores prior to quenching. The cured cores are fed into the cooling equipment through an internal parts cueing hopper that can function as an accumulator in the system and that facilitates runtime changeover to new core formulations. Since the golf ball cores are pre-cooled to room temperature at the press, handling and post processing is enhanced and cooling time is dramatically reduced thereby reducing work in progress. The system also includes an automated core delivery system, for example, integrated pneumatic golf ball core delivery system, optionally with an automated sorter to reject cores with excess flash from delivery to the next processing station, eliminating the need for manual handling of the cores.

DETAILED DESCRIPTION OF THE INVENTION

The present invention is directed to systems and methods for making golf ball cores. In one embodiment, these cores are substantially solid and form a center of a golf ball. The cores created in accordance with the present invention can be encased by a single-layer or multiple-layer cover, which is subsequently painted. The golf balls can also include intermediate layers of molded or wound material as known by those of ordinary skill in the art. Exemplary embodiments of the present invention, therefore, are not limited to incorporating the cores into any particular golf ball construction, and cores created in accordance with the present invention can be used in a variety of golf ball configurations.

Figure 1:
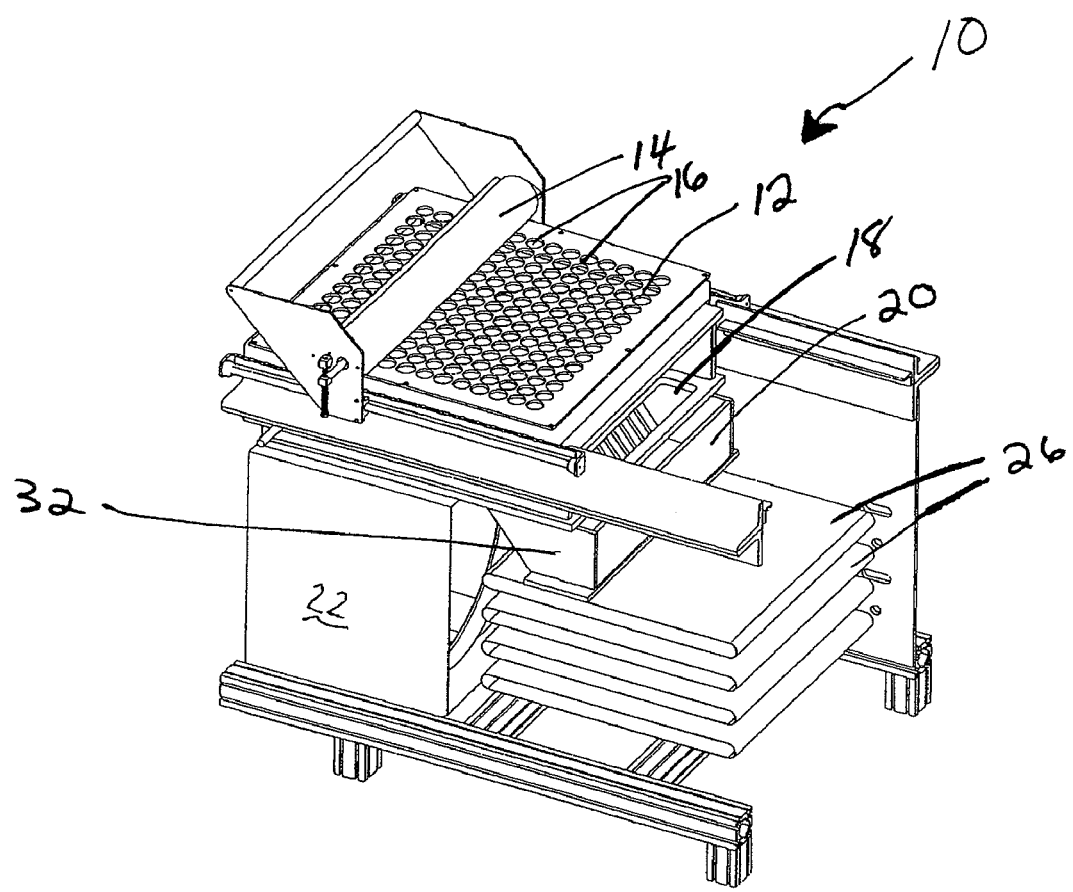
FIG. 1 is a top perspective view of an embodiment of the golf ball core processing assembly in accordance with the present invention.
Figure 2:
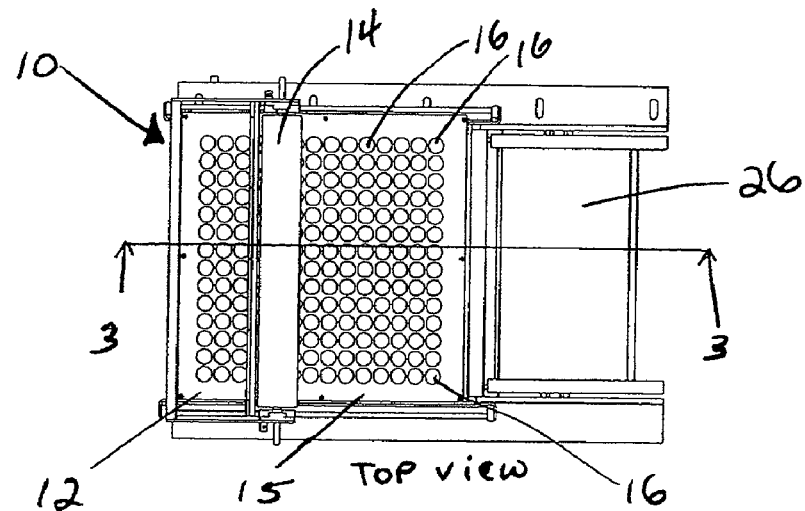
FIG. 2 is a top view of the golf ball processing assembly.
Figure 3:
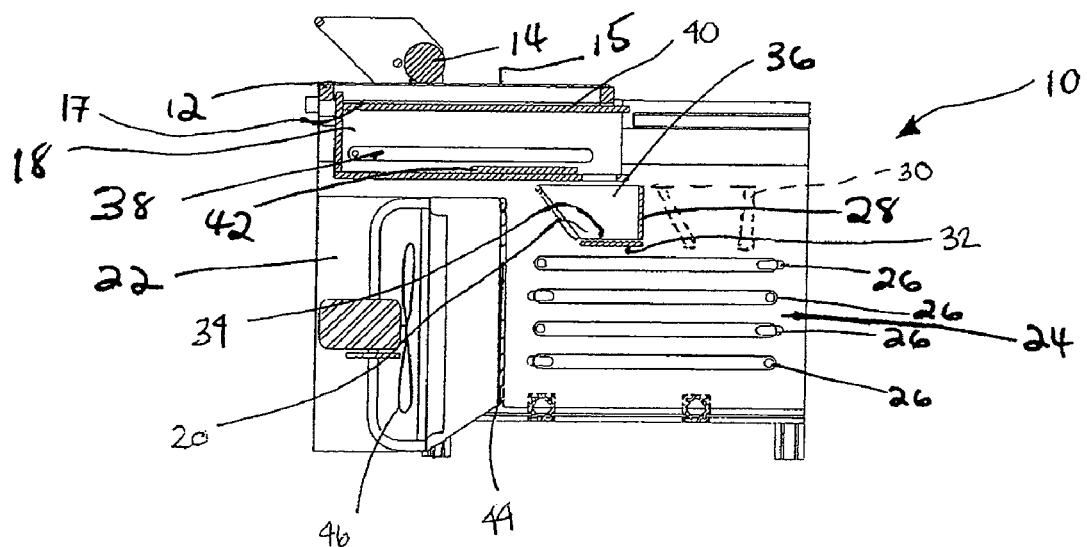
FIG. 3 is a view through line 3-3 of FIG. 2.

Exemplary embodiments of systems in accordance with the present invention provide for the processing of the golf ball cores following molding. In particular, integrated and automated post mold curing, buffering and cooling systems are provided, saving both process time and cost. Referring to FIGS. 1-3, an embodiment of a die-out table assembly 10 for golf ball cores in accordance with the present invention is illustrated. The die-out table assembly is arranged to receive a tray of hot golf ball cores arranged in a matrix directly from a mold, to remove the golf ball cores from the mold, to provide additional curing of the golf ball cores and to cool the golf ball cores in preparation for additional processing.

The assembly includes die plate 12 containing a plurality of holes 16. Each hole 16 is sized to allow passage of a single golf ball core. In other words the inner diameter of hole 16 is substantially the same as the outer diameter of a golf ball core. Since the golf ball cores are brought into contact with the die plate in a continuous matrix corresponding to the mold used to produce the cores, holes 16 are arranged in a pattern corresponding to the post-mold matrix of hot golf ball cores. Die plate push assembly 14 is provided on first side 15 of die plate 12 and is arranged to push the hot golf ball cores through holes 16 in die plate 12. Preferably, die plate push assembly 14 is a roller assembly; however, any suitable assembly capable of pushing golf ball cores through holes 16 can be used.

Disposed adjacent die plate 12 is post-cure unit 18 that is arranged to receive golf ball cores passing through die plate 12. As illustrated, post-cure unit 18 is disposed approximate to second side 17 of die plate 12 opposite first side 15. Post-cure unit 18 provides a suitable environment for additional curing of the golf ball cores. In one embodiment, post-cure unit 18 includes sealable entrance 40, sealable exit 42 and a sufficient amount of insulation to conserve heat in the golf ball cores so that cross-linking reactions continue within the golf ball cores at nearly the same rate as when the golf ball cores were in a heated mold.

The sealable entrance 40 and sealable exit 42 include movable doors that permit golf ball cores to be placed into and removed from post-cure unit 18. In one embodiment, sealable entrance 40 is sized such that the golf ball cores fall directly through die plate 12 and into post-cure unit 18. Sealable exit 42 is generally disposed at one end of post-cure unit 18, and the golf ball cores are disposed throughout post-cure unit 18; therefore, conveying mechanism 38 is provided to convey the golf ball cores toward sealable exit 42 in order to remove the golf ball cores from post-cure unit 18. In one embodiment, conveyor mechanism 38 is a conveyor belt. Suitable conveyor belts are known and available in the art. Post-cure unit 18 may also add heat to the golf ball cores, if necessary, to complete the curing process. Heat can be added via conduction, convection or radiation. Energy can also be added through microwaves. A temperature sensor, for example, thermocouple or thermister, can be used to measure the temperature of unit 18, and if the temperature is lower than a predetermined level then heat can be added.

Assembly 10 also includes cooling section 24 capable of receiving hot golf ball cores and arranging them to remove heat from the golf ball cores. Cooling section 24 includes fan assembly 22 positioned to move air across the golf ball cores. Fan assembly is sized to move a sufficient volume of air across the golf ball cores to provide a sufficient degree of cooling during the period of time in which the golf ball cores are contained within cooling section. Although cool air can be supplied, preferably air is obtained and used at the ambient temperature, i.e., room temperature. Fan assembly 22, which includes fan 46, could be used to produce ether a laminar or turbulent flow of air across the golf ball cores. Preferably, fan assembly 22 produces a turbulent air flow. Suitable fans are known and available in the art. In one embodiment, in order to provide for the desired type of air flow, that is, laminar or turbulent, and to provide sufficient distribution of the air flow through cooling section 24 and across the golf ball cores, fan assembly 22 includes at least one air diffuser 44, such as a honey comb, disposed between fan 46 and the golf ball cores.

Cooling section 24 includes structures to retain the golf ball cores for a sufficient period of time to achieve the desired level of cooling. In one embodiment, cooling section 24 includes at least one, and preferably a plurality of conveyors or conveyor belts 26. Conveyors belts 26 are arranged in series. Preferably, conveyor belts 26 are arranged in a vertical stack, with adjacent belts moving in opposite directions to transport the cores in a serpentine fashion.

In one embodiment, assembly 10 includes a cueing hopper 20. Cueing hopper 20 acts as a buffer or accumulator in assembly 10 for controlling the flow of golf ball cores through assembly 10. This facilitates process changes or changes in golf ball core batches in runtime without stopping the entire process. Cueing hopper 20 can be located at various positions within the assembly.

Cueing hopper 20 is sized to hold a sufficiently large number of golf ball cores. In one embodiment, cueing hopper 20 can hold at least as many golf ball cores as are contained in a single post-mold matrix. Cueing hopper 20 includes open top 36 to receive the golf ball cores from post-cure unit 18 and open bottom 34 to deliver the golf ball cores to cooling section 24. Fixed baffle 32 is provided such that in first position 28, open bottom 34 is positioned over fixed baffle 32 to prevent the golf ball cores from passing through open bottom 34. In this position, cueing hopper 20 is functioning as a buffer or accumulator to halt the flow of golf ball cores. Golf ball cores, however, are still moving through post-cure unit 18 and cooling section 24. In second position 30, represented in dashed lines, open bottom 34 is not positioned over fixed baffle 32 to allow the golf ball cores to pass through open bottom 34. Cueing hopper 20 is moveable and selectively positionable in either first position 28 or second position 30. As illustrated, in second position 30, open top 36 is not in communication with post-cure unit 18. Therefore, delivery of golf ball cores to cooling section 24 is handled in a batch-type process where cueing hopper 20 is filled and moved to second position 30 to be emptied. Alternatively, open top 36 can be in communication with post-cure unit 18 when in second position 30, allowing golf balls cores to pass directly through cueing hopper 20 in a more continuous flow operation.

Figure 4:
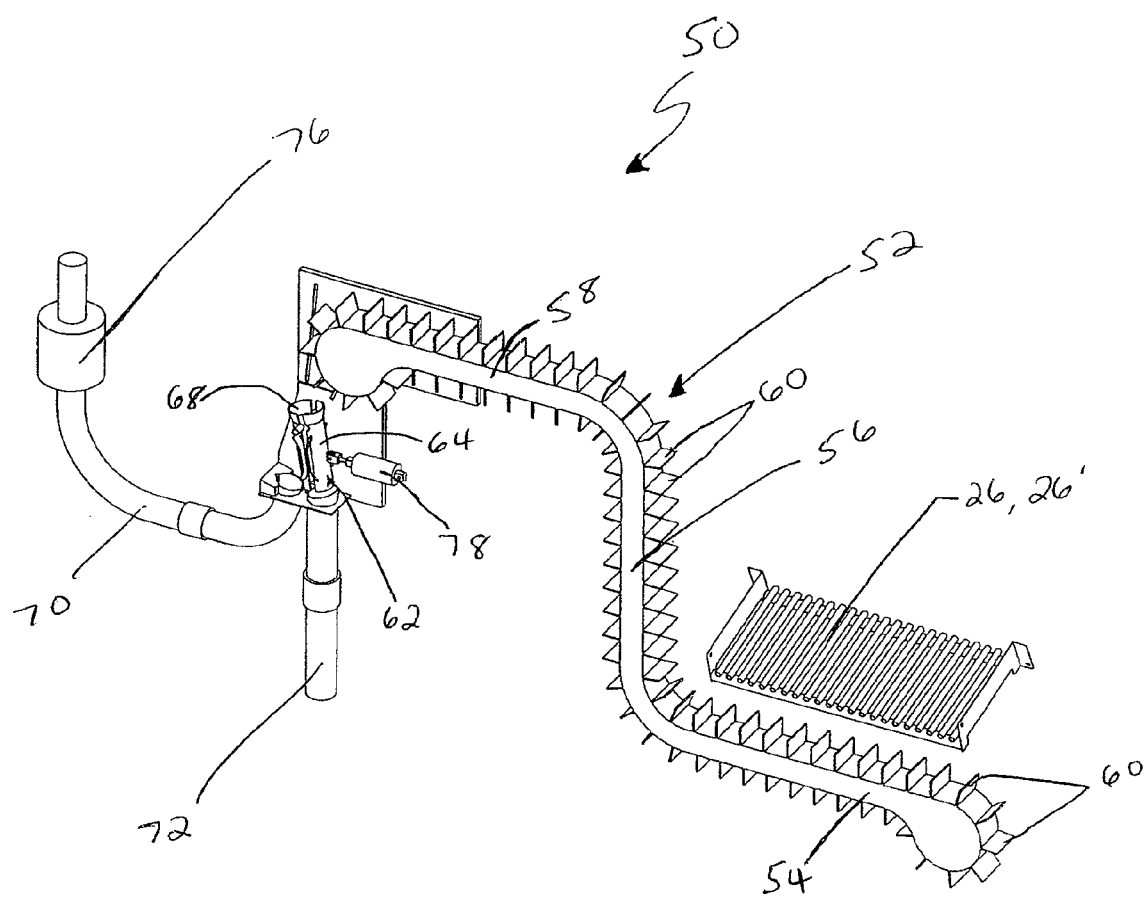
FIG. 4 is a perspective view of an automated core delivery system.

In another embodiment shown in FIG. 4, assembly 10 also includes an automated core delivery system 50 in communication with the cooling section 20 to receive cooled golf ball cores and to deliver the cooled cores to subsequent manufacturing processes. Automated core delivery system 50 includes cleated belt 52, which has lower portion 54, riser portion 56 and upper portion 58. Cleated belt 52 is designed to bring cooled golf ball cores from a lower elevation, where it receives directly or indirectly the cores from die-out table assembly 10, to an upper elevation to that the cores can be fed by gravity to an automatic, pneumatic sorter that rejects golf ball cores that contain substantial defects such as molding flash and to pass through golf ball cores for additional processing that are substantially within the desired or acceptable size.

Cooled golf ball cores are delivered from cooling section 20 at the last conveyor 26 in the cooling section or a device 26' connected to conveyer 26. The cores are carried upward through riser 56 by cleats 60. At the upper portion 58 of cleated belt 52 the cores are dropped into an adjustable divert tube 62. In one preferred embodiment, divert tube 62 comprises two halves 64 and 68 as shown in FIG. 4. Divert tube 62 is movable, preferably rotatable between a first position aligning with passing tube 70 and a second position aligning with reject tube 72. Passing tube 70 is connected to a pneumatic device 76 that provides a negative pressure or suction at the end of tube 70 to pull the golf cores. In the first position, the two halves 64, 68 are drawn together or otherwise positioned so that a first diameter between them is sized and dimensioned to allow acceptable golf ball cores to passthrough. Golf ball cores that are defectives, e.g., cores with molding flash, would become stuck in divert tube. Electronic photo eye 78 is pointed at divert tube 64 to detect such jams and causes divert tube 62 to move to the second position.

In the second position, the two halves 64, 68 are pulled apart or otherwise positioned so that a second diameter between them is sized and dimensioned to let the defective ball cores drop by gravity into reject tube 72. The defective cores are discarded or are reground to be used later. Preferably, in the second position the diameter of divert tube 62 is about 0.015 inch to about 0.25 inch larger than the molded core size to ensure that the defective cores can be readily dropped into reject tube 72. The accepted cores are transported to another manufacturing process to have cover layer(s) placed thereon.

Alternatively, electronic photo eye 78 can be replaced by pressure sensors that can detect pressure buildup due to a jam in divert tube 62. Electronic eye 78 or equivalent pressure sensors can be connected to a controller (not shown) and the controller is connected to divert tube 62 to control its diameter and movement. Also, divert tube 62 may have a variable diameter iris instead of the two halves.

Exemplary embodiments in accordance with the present invention are also directed to methods for cooling golf ball cores. Initially, a matrix of hot golf ball cores is removed directly from a mold and is placed on a die plate. The die plate includes a plurality of holes arranged in a pattern corresponding to the matrix of golf ball cores with each hole sized to allow the passage of a single golf ball core, and the golf ball cores in the matrix are aligned with the holes in the die plate. The matrix of hot golf ball cores is passed or pushed through the die plate to separate individual golf ball cores from the matrix, for example using a roller assembly. The loose golf ball cores gravity drop into the post-cure unit located just below the die plate.

The golf ball cores are retained or held in the insulated and sealed post-cure unit for a pre-determined period of time to further cure the golf ball cores. In one embodiment, this pre-determined period of time comprises about eight minutes. Therefore, the fresh hot cores, having a temperature of approximately 370° F., remain in the post-cure section insulated and sealed away from the ambient environment and the high velocity forced air in the cooling section. The post-cure section has actuated sealable doors on both the entrance and exit to seal in and conserve the heat that the golf ball cores came into the post cure unit with. Cross-linking reactions will continue at nearly the same rate as when the rubber stock of the golf ball cores was in the hot mold, yielding optimal physical properties of the core with no sacrifice to machine productivity.

After the cure within the post-cure unit has ended, the exit door opens and an open wire conveyor belt drives the additionally or "fully" cured golf ball cores to fall off the end of the post-cure conveyor and cascade down into the cooling section. Within the cooling section high velocity air is passed over the golf ball cores to remove heat from the golf ball cores. In general, the cooling section contains a high velocity air fan that blows room temperature air in turbulent flow over the cores to remove the heat from the core that remained after the molding operation. In one embodiment, there are 4 open wire conveyor belts moving slowly to achieve a retention time of approximately 37 minutes. The conveyor belts move in opposite directions, driving the cores off the end of each conveyor in a vertical stack of conveyors and forming a cascade of cores from one conveyor level to the next.

In one embodiment, the high velocity air is passed through at least one baffle to produce a desired coverage and flow pattern in the high velocity air flow. The golf ball cores are conveyed through the high velocity air flow at a rate sufficient to produce a desired level of cooling in the golf ball cores, for example, by conveying the golf ball cores along a series of conveyor belts. These conveyor belts are arranged as a vertical stack of conveyor belts. Once the cores reach the bottom conveyor, they are driven to the far end to exit the cooling section where they drop into an automated core delivery system, such as a pneumatic delivery system, to reject defective cores and transport the accepted cores to the next operation.

In one embodiment, the cooled golf ball cores are forwarded to a pneumatic delivery system to send the golf ball cores to subsequent processing steps, that is, to encase the cores with golf ball covers. In forwarding the golf ball cores, golf ball cores having significant amounts of molding flash are prohibited from being forwarded to the pneumatic delivery system. In one embodiment, in order to prohibit the golf ball cores from being forwarded, golf ball cores having significant molding flash are diverted to a gravity drop reject tube, while golf ball cores without significant molding flash pass through a tube having an internal bore sized to not allow a golf ball core with significant molding flash to pass.

In general, the pneumatic delivery (PD) system automatically sends golf ball cores to the next operation to finish the cores, that is, to incorporate the golf ball cores into finished golf balls. The golf ball cores first see a 2-position divert tube to direct the core in either a gravity drop reject tube or into the PD tube, where the golf ball cores are drawn in by negative pressure at the entrance. The 2-position divert tube is made of 2 half segments that remain together while in the position to feed cores into the PD tube. With the segments held together, the internal bore of the tube assembly is sized to not allow a core with significant molding flash to pass through to jam the PD system, like a filtering operation. An electronic photo eye is used to detect any jams in the system, and the divert tube will automatically be driven to the second position above the reject tube where the segments will be driven apart to allow the jammed part to easily fall down the over-sized reject tube.

In one embodiment, the golf ball cores are passed though an internal cueing hopper, for example when passing from the post-cure unit to the cooling section. A quantity of the golf ball cores is delivered to a cueing hopper and is held in the cueing hopper for a pre-determined duration. The predetermined period can be brief, i.e. only as long as needed to fill the hopper. In one embodiment, the pre-determined duration is less than about 20 minutes. In general, the cueing hopper is a simple chute that is driven horizontally between two positions. The first position is the cueing position, with the hopper located above a fixed baffle. In this position, the cores will build up in the hopper. Once the hopper is driven to a second position with the fixed baffle left behind, the cores will fall freely onto the upper conveyor of the cooling section. Therefore, the golf ball cores drop through or into the internal cueing hopper depending on the position of the hopper, i.e., open or closed off on the bottom.

The intent of the cueing hopper is to segregate groups of cores when the operator deems it necessary as in a situation of product changeover. The action of cueing for duration not to exceed 20 minutes will open up a gap in the flow of product through the cooling section to allow for a segregation of the different products downstream.

Formulations used in making the golf ball cores include, for example, at least polybutadiene, metal salt diacrylate, dimethacrylate, or monomethacrylate, a free radical initiator, zinc, or calcium oxide and other additives.

The polybutadiene preferably has a cis 1,4 content of above about 90% and more preferably above about 96%. Commercial sources of polybutadiene include CB-23 from Bayer, Shell 1220 manufactured by Shell Chemical, Neocis BR40 manufactured by Enichem Elastomers, and Ubepol BR150 manufactured by Ube Industries, Ltd. If desired, the polybutadiene can also be mixed with other elastomers known in the art, such as natural rubber, styrene butadiene and/or isoprene in order to further modify the properties of the core. When a mixture of elastomers is used, the amounts of other constituents in the core composition are based on 100 parts by weight of the total elastomer mixture.

Suitable metal salt diacrylates, dimethacrylates, and monomethacrylates include, but are not limited to, those wherein the metal is magnesium, calcium, zinc, aluminum, sodium, lithium or nickel. Zinc diacrylate is preferred, because it provides golf balls with a high initial velocity. The zinc diacrylate can be of various grades of purity. For the purposes of this specification, a lower quantity of zinc stearate present in the zinc diacrylate produces a zinc diacrylate of higher purity. Zinc diacrylate containing less than about 10% zinc stearate is preferable. More preferable is zinc diacrylate containing about 4-8% zinc stearate. Suitable, commercially available zinc diacrylates include those from Rockland React-Rite and Sartomer. The preferred concentrations of zinc diacrylate that can be used are 20-50 pph based upon 100 pph of polybutadiene or, alternatively, polybutadiene with a mixture of other elastomers that equal 100 pph can be used.

Free radical initiators are used to promote cross-linking of the metal salt diacrylate, dimethacrylate, or monomethacrylate and the polybutadiene. Suitable free radical initiators for a preferred embodiment include, but are not limited to, peroxide compounds, such as dicumyl peroxide, 1,1-di(t-butylperoxy)3,3,5-trimethyl cyclohexane, a-a bis(t-butylperoxy)diisopropylbenzene, 2,5-dimethyl-2,5 di(t-butylperoxy)hexane, or di-t-butyl peroxide and mixtures thereof. Other useful initiators would be readily apparent to one of ordinary skill in the art. Initiators at 100% activity are preferably added in an amount ranging between about 0.05 and 2.5 pph based upon 100 parts of butadiene, or butadiene mixed with one or more other elastomers. More preferably, the amount of initiator added ranges between about 0.15 and 2 pph and most preferably between about 0.25 and 1.5 pph. The free radical initiator is added in an amount dependent upon the amounts and relative ratios of the starting components, as would be well understood by one of ordinary skill in the art.

In one embodiment, the core composition includes about 5 to 50 pph of zinc oxide in a zinc diacrylate-peroxide cure system that cross-links polybutadiene during the core molding process. Alternatively, the zinc oxide can be eliminated in favor of calcium oxide in the golf ball core composition. The amount of calcium oxide added to the core-forming composition as an activator is typically in the range of about 0.1 to 15, preferably about 1 to 10, most preferably about 1.25 to 5, parts calcium oxide per hundred parts (pph) of polybutadiene.

The core compositions utilized in accordance with the present invention may also include fillers, added to the elastomeric composition to adjust the density and/or specific gravity of the core. As used herein, the term "fillers" includes any compound or composition that can be used to vary the density and other properties of the subject golf ball core. Fillers useful in the golf ball core according to the present invention include, but are not limited to, zinc oxide (in an amount significantly less than that which would be necessary without the addition of the calcium oxide), barium sulfate and regrind, which is recycled cured core material ground to 30 mesh particle size. The amount and type of filler utilized are governed by the amount and weight of other ingredients in the composition. Appropriate fillers generally used range in specific gravity from about 2.0 to 5.6.

Antioxidants may also be included in the elastomer cores. Antioxidants are compounds that prevent the breakdown of the elastomer. Useful antioxidants include, but are not limited to, quinoline type antioxidants, amine type antioxidants and phenolic type antioxidants.

Other ingredients such as accelerators, e.g. tetra methylthiuram, processing aids, processing oils, plasticizers, dyes and pigments, as well as other additives well known to the skilled artisan may also be used in amounts sufficient to achieve the purpose for which they are typically used.

The desired ingredients are adequately mixed using methods available and known in the art. The mixed core material is then molded into golf ball cores using molding techniques including compression molding and injection molding.

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

What is claimed is:

1. A method for processing golf ball cores, the method comprising:
   passing a matrix of hot golf ball cores through a die plate to separate individual golf ball cores from the matrix, the die plate comprising a plurality of holes, wherein each hole is sized to allow passage of a single golf ball core, wherein a die plate roller assembly disposed on a first side of the die plate pushes the cores through the holes in the die plate; holding the golf ball cores in an insulated and sealed post-cure unit for a predetermined period of time to further cure the golf ball cores, the post-cure unit being disposed adjacent to the die plate and arranged to receive the cores passing through the die plate and wherein the post-cure unit is disposed adjacent a second side of the die plate opposite the first side; feeding the golf ball cores from the post-cure unit to a movable cueing hopper sized to hold a plurality of cores; and feeding the golf ball cores from the post-cure unit to a cooling section, where high velocity air is passed over the golf ball cores to remove heat from the golf ball cores.

2. The method of claim 1, wherein the step of passing high velocity air further comprises passing the high velocity air through at least one air diffuser to produce a desired coverage area and flow pattern in the high velocity air flow.

3. The method of claim 2, wherein the air diffuser has a honeycomb structure.

4. The method of claim 2, wherein the air diffuser is positioned between a fan used to generate the high velocity air and the golf ball cores.

5. The method of claim 1, wherein a fan assembly is used to pass the high velocity air over the golf ball cores to remove heat from the golf ball cores.

6. The method of claim 1, wherein the fan assembly produces a laminar flow of air across the golf ball cores.

7. The method of claim 1, wherein the fan assembly produces a turbulent flow of air across the golf ball cores.

8. The method of claim 1, wherein the cooling section includes conveyor belts for holding the golf ball cores.

9. The method of claim 8, wherein the conveyor belts are arranged in a vertical stack with adjacent belts moving in opposite directions.

* * * * *